Feb. 21, 1956    C. D. COFFEY    2,735,439
COMBINED MANUAL AND SAFETY VALVE
Filed Dec. 29, 1951
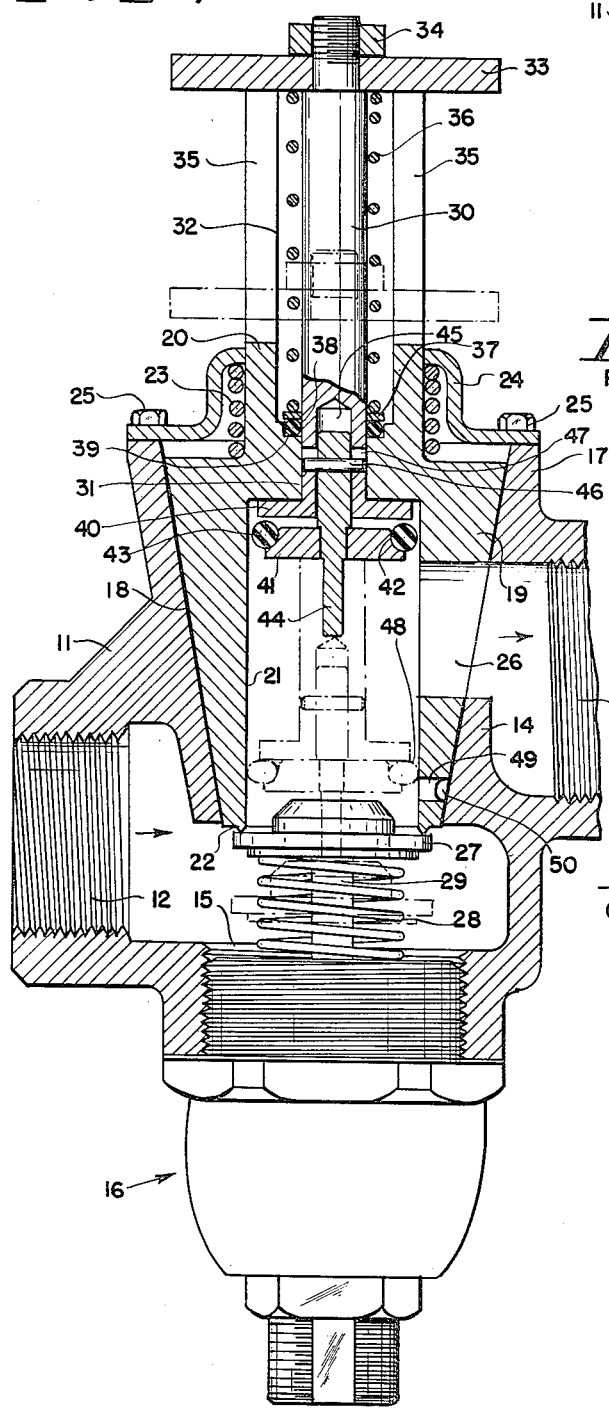
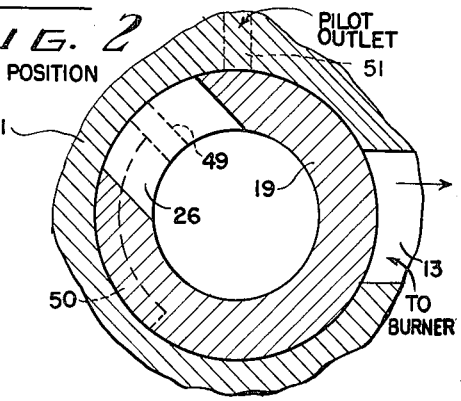
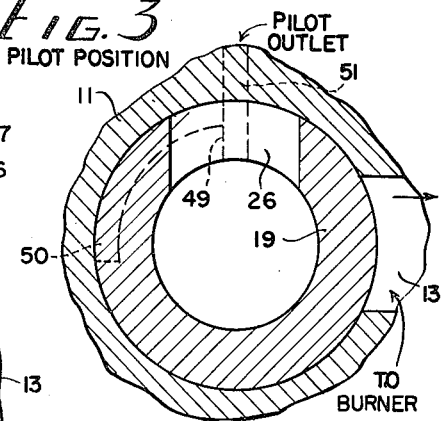
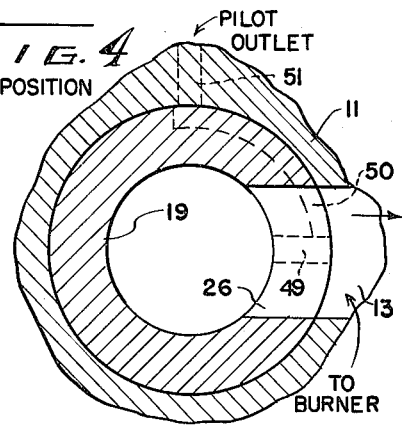
INVENTOR.
CHARLES D. COFFEY
BY
*George H. Fisher*
ATTORNEY ns Patent Office
2,735,439
Patented Feb. 21, 1956

1

2,735,439

COMBINED MANUAL AND SAFETY VALVE

Charles D. Coffey, Inglewood, Calif., assignor to Minneapolis-Honeywell Regulator Company, Minneapolis, Minn., a corporation of Delaware Application December 29, 1951, Serial No. 264,152

6 Claims. (Cl. 137—66)

This invention relates to a combined manual and safety valve generally and, more particularly, to the combination of a plug valve in series with a safety valve of the manually reset type, for use in gas burner installations.

Valves of this general type are well known in the heating controls art. For example, Thornbery Patent Number 2,229,826, shows an arrangement of a manually operable valve and a safety valve in series therewith which is generally similar to that of the present invention. However, the specific combination of parts and mode of operation of the valves of Thornbery and the applicant are quite different, although each obtain the same final results.

As valves of the above mentioned type are likely to be operated by occupants of homes, who have little knowledge of the various controls of the heating system and the operation thereof, it is highly desirable that the control means for initiating operation of the heating system be made as simple and as fool proof as possible. Therefore, it is desirable that the number of parts to be actuated by the operator be held to a minimum, as well as the number of steps to be taken in starting the heating system.

It is an object of this invention to provide a combined manually operable shut off valve (generally known as an "A" valve) in series with a pilot burner controlled safety valve in a very compact and structurally strong valve assembly.

Another object of the invention is to provide a combined plug and safety valve wherein a third shut off valve is provided to prevent main gas flow during the resetting of the safety valve, which third valve is non-stickable.

Still another object of the invention is to provide a combination plug and safety valve wherein a piston type of shut off valve, for cutting off gas to the main burner during the resetting operation of the safety valve, has means for sealingly expanding the piston unit against the plug valve between the main burner outlet and the pilot outlet of the valve.

Another object of the invention is to provide a combined plug and safety valve wherein an expandable piston-type of shut off valves is coaxial with the plug and safety valve and slidable in an axial bore in said plug valve.

Other objects of the invention will become apparent upon reading the following detailed description of the invention in conjunction with the accompanying drawing wherein:

Figure 1 is a vertical sectional view of the valve body with a part of the outlet thereof broken away and an electromagnetic unit shown in elevation;

Figure 2 is a cross-sectional fragmentary view of the valve taken along a horizontal line through the outlet opening of the plug valve, with the plug valve in an angular position which cuts off both main and pilot gas flow;

Figure 3 is a view similar to Figure 2, wherein the plug valve is in an angular position which permits pilot gas flow but no main gas flow; and Figure 4 is a view similar to Figures 2 and 3, wherein the plug valve is in an angular position which permits both pilot and main gas flow.

Referring to Figure 1 of this drawing, the reference numeral 11 designates a valve body having a threaded inlet 12, a threaded outlet 13, and a dividing or partition wall 14 between said inlet and outlet. The bottom of this valve body has a threaded opening 15 in which is screw threaded an electromagnetic safety valve unit, generally designated by the reference numeral 16. This unit 16 is of a conventional construction and forms no part of the invention except in its broad combination with the other details of the valve, to be presently described. Formed in the dividing or partition wall 14 and an upper wall 17 of the valve body 11 and extending therethrough, is an inwardly and downwardly beveled, frusto-conical opening 18 that is coaxial with the electromagnetic unit 16 and intersects said outlet 13.

Positioned in the opening 18, is a plug valve 19 of frusto-conical shape, having a sleeve like stem 20 thereon extending upwardly from the upper end thereof and having an axial bore 21 extending upwardly from the lower end thereof. The lower end of the plug valve 19 extends below the lower surface of the dividing wall 14 and has an annular rib 22 formed thereon to provide a valve seat. The plug valve 19 is retained in the opening 18 by means of a compression spring 23 extending between the upper surface of the plug valve and a retaining ring 24 secured to the upper surface of the valve body 11 by bolts 25. It is thus seen that the plug 19 is resiliently yet firmly held in sealing relationship with the opening 18. A radially extending bore 26 establishes communication between the bore 21 and the outlet 13 in the "On" position of the plug valve with respect to the valve body, as shown in Figures 1 and 4.

Normally biased into engagement with the valve seat 22, is a disc valve 27. The valve 27 is urged against the seat 22 by means of a compression spring 28, the bias of which may be overcome by an electromagnet (not shown), in the unit 16, holding an armature (not shown) connected to the disc valve 27 by a valve stem 29. The magnet of the electromagnetic unit 16 is adapted to be energized by a thermocouple heated by a pilot burner for a main burner of a heating plant. The magnet is sufficiently strong to hold the armature and the valve 27 in its opened position, when energized, but incapable of attracting the armature into engagement with the electromagnet to open the valve 27, upon energization of the electromagnet.

The means for moving the safety disc valve 27 to its open position is a reset plunger 30 extending through an opening 31 in the upper end of the plug valve 19 and through a larger bore 32 extending inwardly from the upper end of the valve stem 20. The outer or upper end of the plunger 30 has a cross-bar type of handle 33 secured thereto by means of a nut 34. The handle is non-rotatively but longitudinally slidable in diametrically opposed longitudinal slots 35 formed in the wall of the sleeve like stem 20. The handle and stem is normally held in its outermost position, as shown in Figure 1, by means of a coiled compression spring 36 bearing at its upper end against said handle and at its lower end against a washer 37 and a rubber O ring 38 positioned in a recess 39 in the stem 20. It will thus be seen that the spring 36 not only holds the reset stem 30 in its retracted position, but also presses the O ring 38 against the valve stem and plunger to provide a gas tight seal between said stem and plunger. The lower or inner end of the stem 30 has an enlarged disc-like head 40 that normally bears against the upper end of the bore 21 in the plug valve 19. Cooperating with the head 40 is a movable disc member 41 having an arcuately beveled upper peripheral edge 42 which supports an expandable O ring 43, made of any suitable material, such as rubber. The disc 41 is adapted to move vertically with respect to the head 40 by being suitably secured to a pin 44 axially slidable in an axial bore 45 extending upwardly into the stem 30 from the lower surface of the head 40. The pin 44 is prevented from dropping away from the head 40 any more than enough to take the O ring 43 out of engagement with the lower surface of the head 40, by means of a pin 46 extending through the pin 44 and into two diametrically opposed longitudinal slots 47 formed in plunger 30.

The outer diameter of the O ring 43 is normally slightly less than the diameter of the bore 21 so that the ring 43 will freely move vertically in the bore 21 upon limited downward movement thereof from its normal position.

The slots 47 must be at least of such a length that disc 41 may move upwardly enough to compress the ring 43 against the head 40 to cause the ring 43 to sealingly engage the wall of the bore 21, as shown at 48 in Figure 1. This action will take place only after the plunger 30 has been moved downwardly to bring the lower end of the pin 44 into engagement with the upper surface of valve 27, at which point the O ring 43 will be below the transverse opening 26 in the wall of the plug valve 19. The spring 28 is sufficiently strong to prevent the unseating of the valve 27 until after the O ring 43 has been expanded by upward movement of the disc 41 with respect to the head 40. It is thus seen the reset stem 30 may be moved inwardly to engage the valve 27 without any portion of the disc 41, ring 43 or head 40 bearing against the bore 21 until after the ring 43 is positioned below the transverse opening 26. Then, once the expanding force on the O ring 43 balances the force of spring 28, or the disc 41 engages the under surface of head 40, will continued movement of the stem 30 move the valve 27 off of the seat 22.

The reason for providing means to hold the O ring 43 out of engagement with the bore 21 during the time that it is in its retracted position, is to prevent said O ring from adhering to the wall of the bore 21 so as to result in the plunger 30 being incapable of moving inwardly for resetting purposes or from causing damage to the ring 43 in breaking it loose from the wall 21 in such a resetting movement of the plunger.

The reason for providing means for sealing off the gas flow through the transverse bore 26 and outlet 13 during the resetting operation, is to provide for the igniting of a pilot burner prior to the admission of gas to the main burner and only if the electromagnet controlling the safety valve is energized, showing a steady pilot flame.

The supply of gas to the pilot burner during the resetting operation is accomplished by the provision of a radial bore 49 extending through the lower wall portion of the plug valve 19, parallel with the opening 26, and an arcuate groove 50, in the outer peripheral surface of the plug valve, adapted to communicate with the pilot outlet passage 51 formed in the valve body 11. As can be seen by the broken line position of the reset plunger and safety valve actuating means thereon, the valve 27 would be in its open position, with the O ring 43 positioned between the pilot bore 49 and the main gas bore 26, when gas is flowing to the pilot burner only, during the resetting operation.

*Operation*

Assuming that the valve is installed in a gas burner system in a conventional manner, and that the valve is in its shut-off position, that is, with the plug valve 19 positioned in the valve body, as shown in Figure 2, the burner is put into operation by rotating the handle 33 to the "pilot position" shown in Figure 3. Then, the handle 33 is shoved inwardly to move the stem 30 and the pin 44 inwardly into firm engagement with the valve 27. This will cause expansion of the O ring 43 against bore 21 to seal off the flow of gas to the main burner, so that further inward movement of the plunger 30, will cause the unseating of the valve 27 from the valve seat 22 to permit the flow of gas through bore 49, arcuate passage 50, and pilot outlet 51. After igniting the pilot burner and allowing sufficient time for the thermocouple to heat up sufficiently to energize the electromagnetic unit 16, releasing of the handle 33, to permit the spring 36 to return the plunger to its retracted position shown in Figure 1, will admit gas to the bore 21 and transverse bore 26. However, gas will still not flow to the main burner until the plug valve 19 has been rotated to the "on position," shown in Figure 4.

Should the pilot flame become extinguished, subsequent to the placing of the system into operation, the electromagnetic unit 16 will become deenergized causing the dropping out of the armature and connected valve 27 from engagement with the electromagnet of said unit and the closing of said valve 27 against the seat 22 under the bias of spring 28. This will shut off all gas flow, both to the main burner and the pilot burner, a 100% shut off. The pilot burner may then be reignited, without rotating the plug valve 19, by merely shoving inwardly on the handle 33 to reset the safety valve 27. No gas will flow to the main burner even though the transverse bore 26 is in alignment with the outlet 13, due to the fact that the O ring 43 will be sealingly engaged in the bore 21 between the bores 26 and 49.

From the above description of the invention, it is deemed to be apparent that the preferred embodiment of the invention involves both improvements in structure as well as in operation over similar valves in the prior art. It will also be apparent to those skilled in the art that various modifications may be made in the illustrated embodiment of the invention without departing from the spirit thereof. Therefore, it is to be expressly understood that the scope of the invention is to be determined solely from the appended claims.

I claim as my invention:

1. A safety valve comprising a valve body having an inlet and a main outlet with a dividing wall therebetween, a bore through said wall with a valve seat at the inlet end thereof, a small passage leading from the exterior of said body to a point intermediate the ends of said bore, a safety valve biased into seating engagement with said seat, a condition responsive means capable of holding but not attracting said valve to its open position, a piston positioned to move into and out of said bore from the other end thereof and having a stem extending therefrom, an axial bore in the inner end of said stem, a pin slidable in said axial bore and extending therebeyond, a lost-motion connection between said pin and stem, a disc on said pin and spaced from said piston and positioned intermediate the ends of said pin, said disc having an arcuately beveled upper edge, and an expandable ring around said beveled edge and engageable by said piston when said stem moves said piston and pin against said safety valve to expand said ring against said bore between said inlet and said outlet prior to continued movement of said stem, expandable ring and disc and movement of said safety valve to its valve open position wherein said safety valve is capable of being held by said condition responsive means, the intermediate point at which said small passage communicates with said bore being between said inlet end and the innermost point reached by the expandable ring when the safety valve is moved to its open position.

2. A safety valve comprising a valve body having an inlet and an outlet with a dividing wall therebetween, an opening through said wall terminating in a valve seat at the inlet end thereof, a safety valve biased into seating engagement with said seat, a condition responsive means capable of holding but not attracting said valve to its open position, a piston arranged to move into and out of said opening from the other end thereof and having a stem extending outwardly of said body, a bore in the inner end of said stem and through said piston, a pin slidable in said bore and extending therebeyond, a lost-motion connection between said pin and stem, a disc on said pin and spaced from the lower end of said piston and positioned intermediate the ends of said pin, said disc having a beveled upper edge, and an expandable ring positioned on said beveled edge and engageable by said piston when said pin is moved against said safety valve to spread said ring against said opening between said inlet and said outlet and to thereafter open said safety valve upon continued movement of said piston, stem, ring, pin and disc.

3. A safety valve comprising a valve body having an inlet and a main outlet with a dividing wall therebetween, an opening through said wall terminating in a valve seat at one end thereof, a safety valve biased into seating engagement with said seat, a condition responsive means capable of holding but not moving said valve to its open position, a piston movable into and out of said opening from the other end thereof and having a stem thereon, a bore in the inner end of said stem, a pin slidable in said bore and extending therebeyond, a pin and slot connection between said pin and stem, a disc on said pin and spaced from the lower end thereof and said piston, said disc having a beveled upper edge, and an expandable ring around said beveled edge and engageable by said piston when said pin is moved against said safety valve to expand said ring against said opening between said inlet and said outlet to thereafter open said safety valve upon continued movement of said piston, stem, ring and disc.

4. A safety valve comprising a valve body having an inlet and a main outlet and a dividing wall therebetween, a main passage through said dividing wall, a second passage extending from a second outlet in said valve body to a point intermediate the ends of said main passage, a safety valve biased to a closed position over the inlet end of said main passage, condition responsive means for holding said safety valve open against its bias only when said condition exists, and reset means for actuating said safety valve to its open position, said reset means having an expandable means thereon for sealing engagement and slidable in its entirety in said main passage only between said main outlet and second passage upon engaging and opening said safety valve.

5. A safety valve as defined in claim 4, wherein said reset means has means thereon for engaging said safety valve to cause expansion of said expandable means prior to opening said safety valve.

6. A safety valve as defined in claim 4, wherein said condition responsive means is an electromagnet energizable by a thermocouple.

References Cited in the file of this patent

UNITED STATES PATENTS

| | | |
|---|---|---|
| 1,781,224 | Gilg | Nov. 11, 1930 |
| 2,229,826 | Thornbery | Jan. 28, 1941 |
| 2,233,223 | Patterson | Feb. 25, 1941 |
| 2,276,909 | Alfery | Mar. 17, 1942 |
| 2,305,941 | Wantz | Dec. 22, 1942 |
| 2,403,611 | Ray | July 9, 1946 |
| 2,409,947 | Mantz | Oct. 22, 1946 |
| 2,447,207 | Ray | Aug. 17, 1948 |
| 2,503,459 | Thornbery | Apr. 11, 1950 |
| 2,542,127 | Ewing | Feb. 20, 1951 |
| 2,586,249 | Palle | Feb. 19, 1952 |